July 8, 1941.　　C. H. M. BURNHAM　　2,248,742
PIPE CLEANING APPARATUS
Filed May 6, 1939　　3 Sheets-Sheet 1
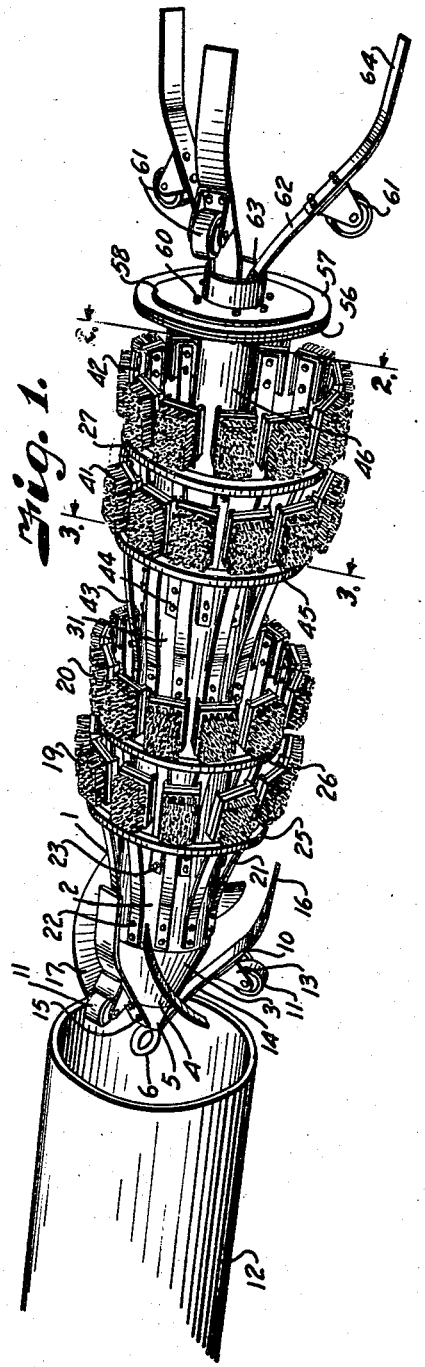
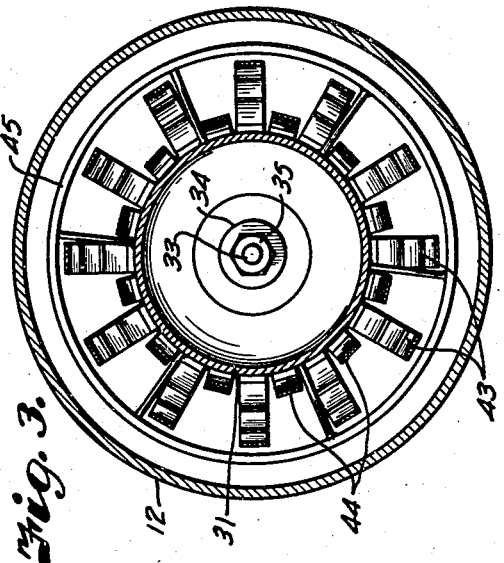
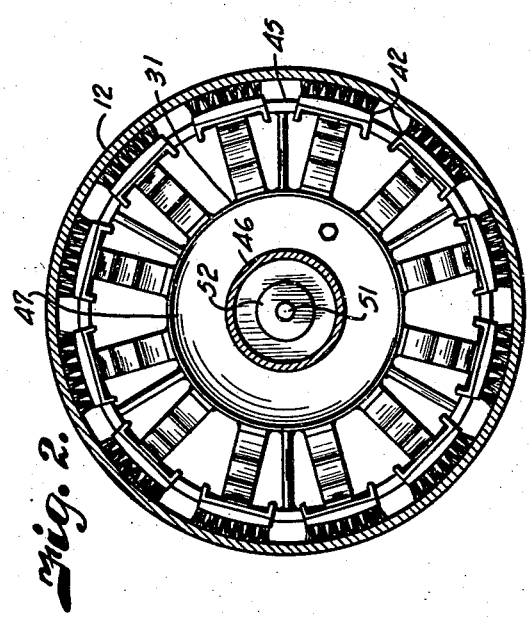
INVENTOR
Charles H. M. Burnham.
BY Arthur L. Brown
ATTORNEY July 8, 1941.  C. H. M. BURNHAM  2,248,742
PIPE CLEANING APPARATUS
Filed May 6, 1939  3 Sheets-Sheet 2
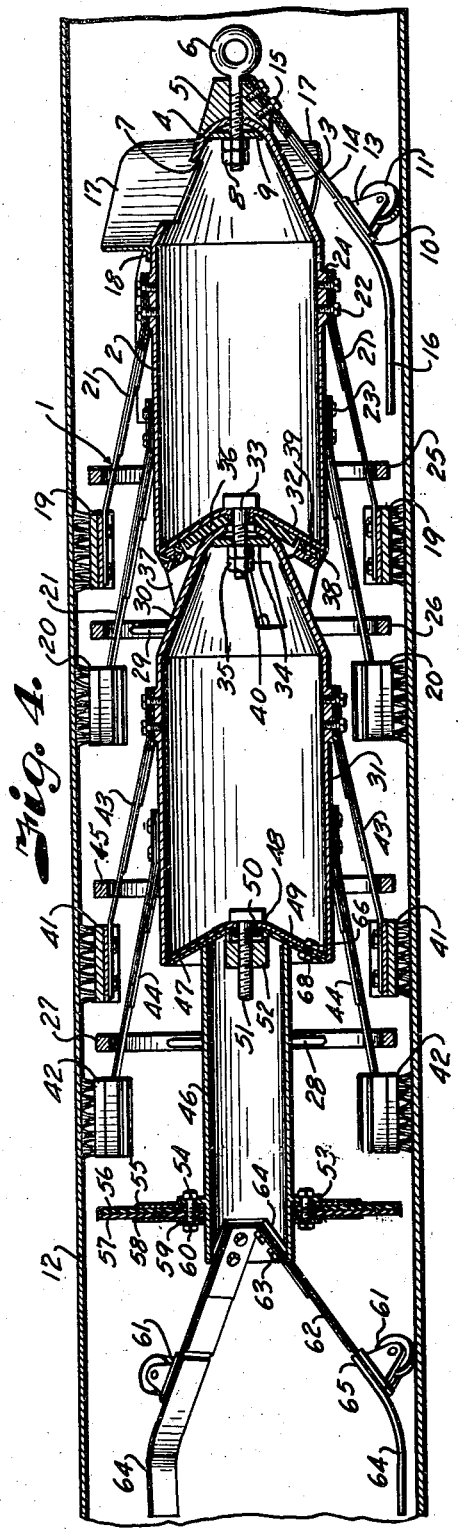
INVENTOR
Charles H. M. Burnham.
BY Arthur C. Brown
ATTORNEY July 8, 1941.　　　C. H. M. BURNHAM　　　2,248,742
PIPE CLEANING APPARATUS
Filed May 6, 1939　　　3 Sheets-Sheet 3
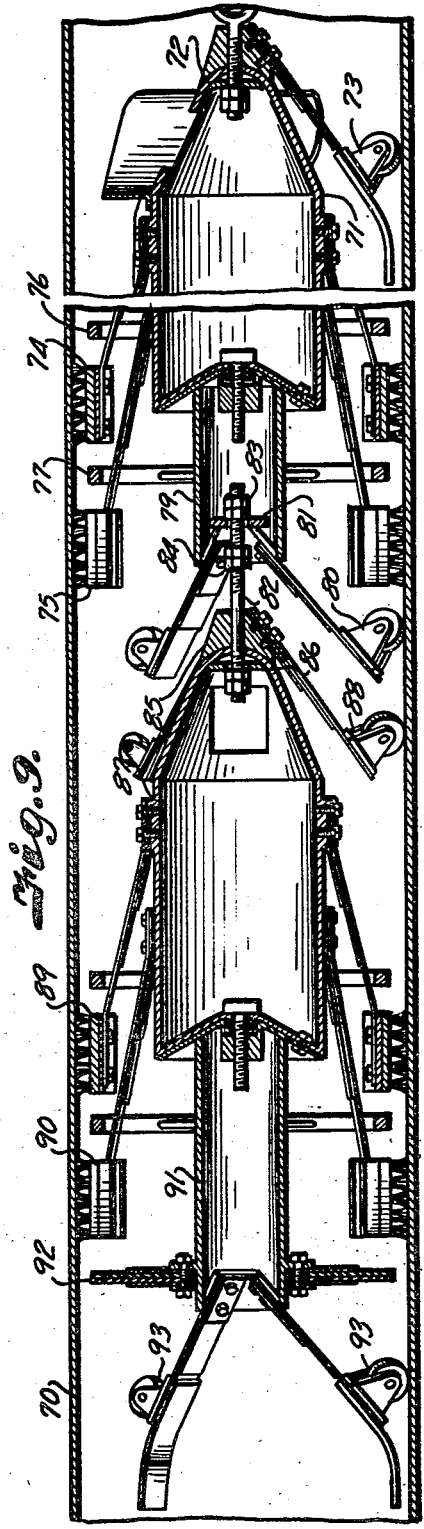
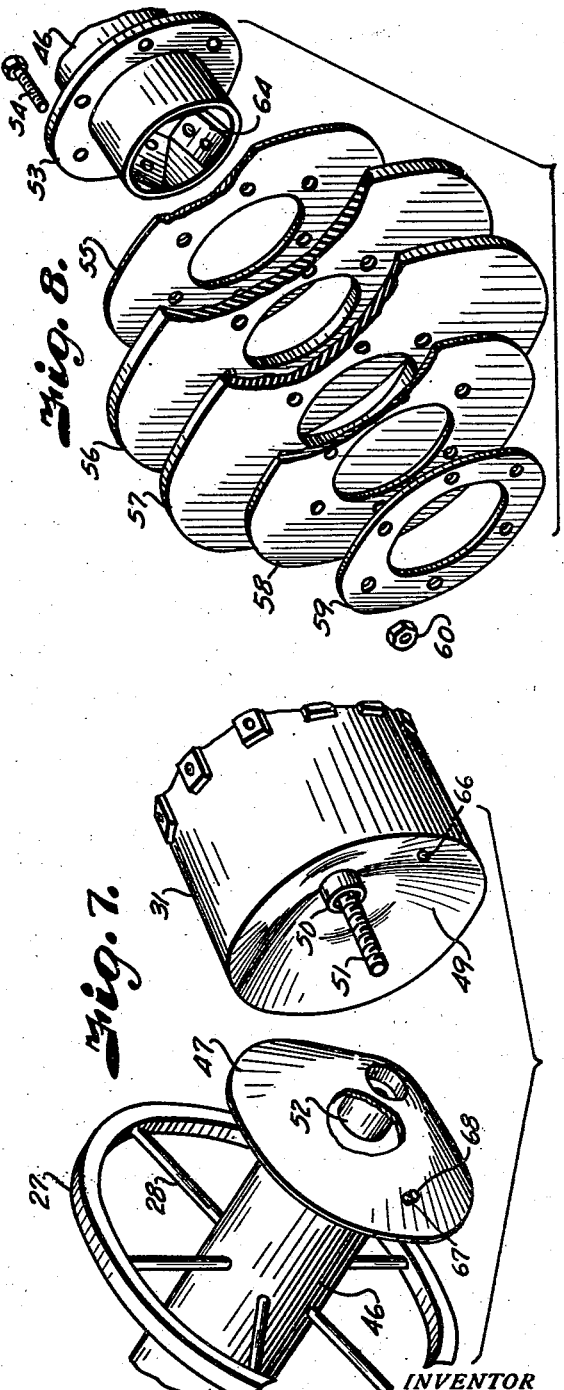
INVENTOR
Charles H. M. Burnham.
BY Arthur C. Brown
ATTORNEY Patented July 8, 1941

2,248,742

UNITED STATES PATENT OFFICE 2,248,742

PIPE CLEANING APPARATUS

Charles H. M. Burnham, Kansas City, Mo., assignor to Panhandle Eastern Pipe Line Company, Kansas City, Mo., a corporation of Delaware Application May 6, 1939, Serial No. 272,190

9 Claims. (Cl. 15—104.06)

This invention relates to pipe cleaning apparatus and more particularly to a so-called "go-devil" for cleaning pipe lines employed for transmitting fluids such as natural gas.

The principal object of the present invention is to provide for ridding the interior walls of the pipe lines of mill scale, dust, sand, products of corrosion and other extraneous material by wiping, scouring, polishing and similar actions, as an incident to passing a go-devil constructed in accordance with the present invention through the pipe lines to be cleaned.

Other important objects of the present invention are to provide for employing a motive fluid, such as natural gas, ordinarily in the pipe line to be cleaned, as the power for driving the go-devil through the line and to make the go-devil regulative of the flow of motive fluid in such a manner as to utilize portions of the fluid for propelling the go-devil and line debris ahead of the go-devil, respectively; to provide an action of the go-devil causing the debris itself to aid in cleaning the line; to provide for passing the go-devil and the relative parts thereof over obstructions in the line; to provide traction between the go-devil and line through which it is passing of a character aiding effective travel of the go-devil; to articulate the go-devil; to provide for rotating the articulated sections of the go-devil in the same and/or different directions during its passage through the line; to provide for effectively maintaining wiping contact of the cleaning portions of the go-devil relative to the pipe surface being cleaned; to provide a durable, relatively economical and highly efficient go-devil; and to provide improved elements and arrangements of elements in an apparatus of this character.

In accomplishing these and other objects of the present invention, I have provided improved details of structure, the preferred forms of which are illustrated in the accompanying drawings, wherein:

Fig. 1 is a perspective view of a go-devil, embodying the features of the present invention, shown in position prior to application thereof to a pipe line to be cleaned.

Fig. 2 is a detail vertical cross-section through the go-devil on the line 2—2, Fig. 1, particularly illustrating the relation of the wiping elements to the body section.

Fig. 3 is a section similar to Fig. 2 on the line 3—3, Fig. 1, particularly illustrating the staggered relation of the wiping element supports.

Fig. 4 is a substantially central longitudinal section through the preferred form of go-devil, particularly illustrating the parts thereof in preferred relation to each other.

Fig. 5 is a detail front end elevational view of the go-devil showing the relation of the guide rollers and debris deflecting vanes to a pipe being cleaned.

Fig. 6 is a detail perspective view of the preferred form of joint between articulated sections of the go-devil, the parts thereof being shown in disassembled spaced relation.

Fig. 7 is a detail perspective view of the joint between the rear section of the preferred form of go-devil and regulative diaphragm support, the same being shown in disassembled spaced relation.

Fig. 8 is a detail perspective view of the regulative diaphragm and its primary support, the parts thereof being shown in spaced relation and partly broken away to better illustrate their construction.

Fig. 9 is a detail substantially central longitudinal section through a modified form of go-devil, the articulated sections of which are arranged to rotate in different directions.

Referring more in detail to the drawings:

1 generally designates a go-devil constructed in accordance with the preferred form of invention, this form of go-devil preferably consisting of a body section 2 of substantially tubular conformation having a tapered forward end 3 terminating in a bullet-like nose 4. A boss 5 is suitably secured to the nose 4 in forwardly extending relation thereto, and a handling device 6, in the form of an eye bolt, is mounted in the boss 5, as by passing the shank of the bolt through the boss into the interior of the body section 2. A hand opening 7, Fig. 4, is provided in the body section, whereby lock nuts or similar fastening devices 8 may be applied to the threaded shank of the bolt 6 for pressing against a washer or the like 9 to draw the bolt 6 into firmly secured relation to the body section 2.

Mounted on the body section 2, preferably at the forward end thereof and on the boss 5 adjacent the handling device 6, is a series of guide devices 10, each preferably consisting of guide rollers 11 composed of rubber or a similar resilient material for adapting them to fit and apply effective traction between the body section 2 of the go-devil and the interior curved surface of a pipe 12 in which the go-devil is mounted for cleaning the same. The rollers 11 preferably have roller bearing support in brackets 13 suitably secured to supports 14, preferably in the form of leaf springs, arranged to normally expand the rollers outwardly into frictional contact with the pipe and secured to the boss 5 by fastening devices 15.

In order to prevent lodgment or catching of the guide devices 11 in openings, for example, in the pipe, trailer pieces 16 are mounted on the roller supports 14, the trailer pieces extending rearwardly of the rollers a distance sufficient to normally bridge the openings and hold the rollers against passing completely through such openings.

The forward end of the body section 2 is also preferably provided with an annular series of deflecting devices such as vanes 17, which are preferably arcuate in shape, as particularly illustrated in Figs. 1 and 5, and which preferably are arranged diagonally relative to the longitudinal axis of the go-devil in such a manner as to deflect motive fluid impinging thereagainst and effect a swirling action thereof to act on debris loosened from the pipe and throw it against the walls of the pipe to aid in cleaning, scouring and polishing the pipe.

The vanes 17 are preferably secured to the body section 2 adjacent the tapered nose thereof, as by welding the same along the lower inturned edges 18 thereof, as shown in Fig. 4, and the vanes preferably extend substantially forwardly of the body section 2 proper, as particularly shown in Fig. 1.

19 and 20 designate annular series of wiping elements, which preferably consist of wire brushes or similar devices capable of imparting abrasive action to the interior of the pipe for scouring mill scale, dust, sand, products of corrosion and the like therefrom and otherwise efficiently cleaning the same. The wiping elements are preferably suitably mounted on leaf springs 21 arranged to expand the wiping elements outwardly into contact with the pipe and secured to the body section 2 of the go-devil by fastening devices 22 and 23 respectively, the fastening devices 22 of the springs 21 supporting the forward series of wiping elements 19 preferably being mounted on bosses 24 provided on the body section. As shown in Fig. 3, the wiping element supports are preferably arranged in staggered relation in such a manner as to stagger the wiping elements and thus provide a complete or solid wiping contact of the brushes with the interior of the pipe.

It has also been found desirable to limit expansion of the wiping elements 19 and 20, and to this end, reins 25 and 26 are provided, which are preferably of a character such as the rein 27 illustrated in Fig. 7 and shown as consisting of a circular ring or the like having radially disposed tie rods 28. The tie rods of the ring 25 are preferably secured in a suitable manner to the body section 2, and the tie rods 29 of the ring 26 are preferably secured to the nose 30 of the succeeding body section 31 which forms an articulated part or section of the go-devil.

With the construction thus far described, it is apparent that motive fluid may be applied behind or to the left of the go-devil section 2, as illustrated in Fig. 4, which, sufficient pressure being present, forces the go-devil through the pipe. The rollers 11 are preferably turned at an angle, as shown, and effect rotation of the go-devil, while travelling. The brushes loosen scale and the like on the pipe and otherwise efficiently clean the pipe, and the loosened debris is picked up or entrained by the fluid and forced ahead of the go-devil during which action the debris strikes the deflecting vanes and is given a swirling action to act on debris ahead of the go-devil and thus aid in cleaning the pipe.

In order to more efficiently clean the interior of the pipe, the go-devil preferably comprises a series of articulated sections, of which the sections 2 and 31 form a part and constitute a unit therefor.

To firmly secure the sections 2 and 31 relative to each other, the rear end of the section 2 is provided with an inwardly depressed end cap member 32 having an opening for passing a connecting element such as a bolt 33 therethrough, the nose 30 of the section 31 being provided with an aperture alignable with the cap member opening, a washer 34 and lock nuts 35 by which the nose of the section 31 may be "drawn up" relative to the rear end of the section 2.

Articulated sections of this character may build up a unit of considerable length and, where bends occur in pipe to be cleaned, it is desirable to make the go-devil flexible in order to facilitate passing the go-devil around curves in the line. In accomplishing this desideratum, a resilient washer or packing 36, Fig. 6, is provided which has an aperture to pass it over the shank of the bolt 33 for engagement with the depressed outer surface of the cap member 32. The flexibility of the go-devil, and the relative movement between the sections thereof, may be efficiently adjusted by the extent to which the packing 36 is compressed between the nose of the section 31 and the end cap member of the section 2.

Additional support is preferably provided for the flexible connection between the go-devil sections, which, in the present instance, consists of upwardly and forwardly extending brackets 37 arranged in annularly spaced relation on the nose of the section 31. The brackets are provided on their outer ends with preferably rubber blocks 38 secured to the brackets as by fastening devices 39 and being of a thickness adapting them for engagement with substantial portions of the cap member 32 at the outer periphery of the cap member. Adjustments to the flexibility of the go-devil, and the relation of the sections thereof, may be effected manually through the opening 40 in the nose of the section 31.

Annular series of wiping elements 41 and 42 arranged in staggered relation on outwardly expanding resilient supports 43 and 44 may also be provided on the go-devil section 31, and expansion thereof is also preferably limited, similarly to the wiping elements 19 and 20, by reins 45 and 27 secured respectively, in a suitable manner, to the section 31 and a diaphragm support 46, the tie members 28, previously mentioned, being employed to connect the rein 27 with the support 46.

The diaphragm support 46 preferably consists of a tubular member, the forward end of which is particularly illustrated in Fig. 7 where it is shown as being provided with a rearwardly tapered cap or hood 47 which is suitably secured, as at 48, Fig. 4, with the depressed end cap 49 secured, as by welding or the like, at the rear end of the go-devil section 31. The cap 49 of the section 31 is preferably provided with an outwardly directed apertured boss 50 for passing the shank of a tie bolt 51 therethrough and the cap 47 is provided with an inwardly directed apertured boss 52 for receiving the threaded shank of the bolt 51. The members 47 and 49 are preferably secured together by threading the boss 52 on the bolt 51 and threaded apertures 66 and 67 are provided in the members in which a cap screw or the like 66 may be mounted to tie the members in position relative to each other.

As shown in Fig. 8, the diaphragm support 46 is provided with an annular flange 53 adjacent its rear end, in which spaced annularly arranged openings are provided for passing fastening devices 54.

55, Fig. 8, designates a preferably rigid washer engageable over the rear end of the support 46 and having apertures alignable with the apertures in the flange 53 for mounting the same on the fastening devices 54 in desired relation to the flange 53.

The diaphragm proper preferably consists of a pair of duplicate resilient elements 56 and 57, such as rubber or leather plates, which are mountable on the support 46 and adapted to be retained in position thereon by a rigid washer 58, preferably a duplicate of the washer 55, and a lock washer 59 forming a bearing surface for nuts 60 or the like which are matable with the bolts 54 for drawing the relative parts of the diaphragm together, as illustrated in Figs. 1 and 4.

It has also been found desirable to provide a guiding support for the rear end of the go-devil comprising the body sections 2 and 31 and the diaphragm section 46. This guiding support is preferably accomplished by the provision of an annular series of spaced guide rollers 61, preferably having roller bearing support in brackets fixed to the outer ends of outwardly expanding leaf springs 62, the inner ends of which springs are connected, as at 63, and mounted on plate supports 64 suitably secured, as by welding or the like, to the rear end of the diaphragm support 46 and preferably in the interior thereof, as shown in Fig. 4. The rollers 61, like the rollers 11, are preferably angularly disposed relative to the longitudinal axis of the go-devil and effect rotation of the go-devil as an incident to traction between the rollers and interior pipe surface caused by expansion outwardly of the rollers' through the medium of the springs 62. The rollers 61 are also prevented from passing through or being obstructed by holes or the like in the pipe line by trailing pieces 64 suitably secured as at 65 to the outer ends of the leaf spring 62 adjacent the roller supporting brackets, as illustrated in Figs. 1 and 4.

The operation of an apparatus constructed as described is as follows:

The go-devil may be handled by a crane or the like through the eye-bolt 6 on the forward end thereof and placed near an opening in the pipe 12, as shown in Fig. 1. The go-devil is then suitably inserted into the pipe, the opening to the pipe then being closed. The pipe may be opened ahead of the go-devil a desired distance depending upon the part of the pipe line to be cleaned and, where the pipe line is employed for the transmission of natural gas, such transmission may be continued in a suitably regulated manner to build up sufficient pressure differential behind and in front of the go-devil to move the apparatus.

The diaphragm may be of predetermined diameter and of such size as to by-pass a predetermined volume of gas. Such gas is employed for blowing loosened debris ahead of the go-devil and purges the line of previously loosened material. The by-passed gas furthermore absorbs heat of friction between the wiping elements and pipe line and therefore prolongs the effective life of the wiping elements. Succeeding quantities of gas, flow of which is initially impeded by the diaphragm, act on the diaphragm in such a manner as to overcome friction between the wiping elements of the go-devil and the surface of the pipe they engage and thus start the go-devil moving in the line. As gas continues to be supplied, it acts as the power for causing travel of the go-devil through the line. As the go-devil moves, the guide rollers 11 and 61, due to their bearing contact on the inner surface of the line, effect rotation of the go-devil during its travel. The wiping elements, such as the brushes shown, therefore not only scrape debris from the line by dragging thereagainst, but also tend to scour and polish the line with a spiralling action which, because of the staggered relation of the wiping elements, is uniform and efficient in effectively cleaning the interior of the line of mill scale, dust, sand, products of corrosion and similar types of debris. A further benefit derived from rotation of the go-devil is in the uniformity of wear on the respective wiping elements.

As the debris is loosened, gas passing the diaphragm entrains it and forces it against the deflecting vanes, the vanes changing the course of the debris and throwing it against the walls of the line, with an action similar to a sand blast, thereby aiding the wiping elements in cleaning the line.

Where sections of the line are jointed, as by welds or couplings, the resiliency of the roller and wiping element supports allows the go-devil to give and pass over the same and where openings occur in portions of the line, the trailing pieces and the reins prevent the rollers and wiping elements from passing through such holes, thus precluding catching of the go-devil and stopping its progress through the line.

As a matter of practice, the go-devil creates sufficient noise in the line to allow its operators to follow its progress therethrough, and the pressure differentials may be so determined as to regulate and effectively time the passage of the go-devil through a given length of line. It has further been found where the go-devil is used in a natural gas line, that a cloud of dust and gas entrained debris issues from the open end of the line, which varies in intensity depending upon the condition of the line and the effectiveness of the go-devil's cleaning action on the line. The go-devil merely drops out of the open end of the line when its work has been completed. The cleaned line may then be closed, and the go-devil applied to another section of line, a repetition of the operation just described being employed for cleaning the whole length of line.

In Fig. 9, a modified form of apparatus is illustrated, wherein a pipe line 70 to be cleaned is shown as having an articulated go-devil embodying this invention applied thereto. In the modified form of invention, a body section 71 is provided at the forward end of the go-devil, which has a bullet-nose 72 and resilient guide roller support 73 substantially similar to the preferred form of invention.

Staggered annular series of wiping elements 74 and 75, urged outwardly by spring supports controlled by reins 76 and 77 are also provided in accordance with the preferred form of invention. The rear end 78 of the body section 71 is provided with a tubular extension 79, the forward end of which is substantially similar to the connection of the forward end of the diaphragm support 46, Fig. 4, as employed in the preferred form of invention.

The rear end of the tubular section 79 is also provided with resiliently mounted guide rollers 80 much in the manner of the guide rollers 61 employed in connection with the preferred form of invention.

In this instance, a centrally apertured plate 81 is mounted as by welding or the like in the interior of the tubular section 79, and a connecting bolt 82 of less diameter than the aperture in the plate is passed through the plate 81, the bolt 82 preferably being provided with spaced fastening devices such as lock nuts 83 and 84 on opposite sides of the plate, the bolt thus being provided with limited longitudinal and lateral movements relative to the plate 81 for allowing the bolt to freely rotate, and providing a limited articulation at this point.

The rear or outer end of the bolt 82 is then extended through a boss 85 on the bullet nose 86 of a body section 87 forming an articulated joint of the go-devil where it may be secured thereto in a suitable manner. Resiliently mounted outwardly expanding guide rollers 88 are also mounted on the boss 85 at the forward end of the section 87 in a manner substantially similar to the guide rollers 73, with the exception that where the guide rollers 73 are angularly disposed relative to the longitudinal axis of the go-devil in one direction, the guide rollers 88 are angularly disposed in a direction different from the rollers 73. The effect of this is to provide for rotating the respective sections of the go-devil, in different directions at the same time, while the go-devil, as a unit, is travelling through a pipe line and cleaning the same.

The rein controlled staggered annular series of wiping elements 89 and 90 on the section 87 of the go-devil, together with the diaphragm supporting section 91 and diaphragm 92 thereon, are substantially similar to the corresponding elements previously described in connection with the preferred form of invention. The resiliently mounted trailer controlled guiding elements 93 are also substantially similar to those of the preferred form of invention, attention being directed to the fact, however, that the rollers 93 should correspond in angularity to the rollers 88 relative to the longitudinal axis of the go-devil, while the rollers 80 and 73 correspond in angularity, the respective sets rotating the articulated sections of the go-devil in different directions.

The operation of a go-devil constructed as described is substantially similar to that of the preferred form of invention, with the exception that traction between the sets of rollers 88 and 93 on the rear go-devil section causes the section 87 to rotate in an anti-clockwise direction, while movement of the go-devil through the line causes traction between the rollers 73 and 80 to rotate the section 71 in a clockwise direction.

The effect of such action is to create an effective scouring, polishing and otherwise efficient cleaning operation of the go-devil relative to the interior surface of the line in which it operates, in which substantially the total area of the interior surface of the line is acted upon in such a manner that one passage of the go-devil through the line is ordinarily sufficient to materially enhance its efficiency in transmitting natural gas or the like from its source to the point of consumption.

What I claim and desire to secure by Letters Patent is:

1. In an apparatus of the character described, a plurality of interconnected body sections each having resiliently mounted outwardly urged guide rollers and wiping elements engageable with the interior surface of a pipe to be cleaned, means interposed between said sections for imparting longitudinal flexibility to said apparatus, a diaphragm mounted on one of said sections of less diameter than the inner diameter of said pipe for respectively allowing passage and impeding passage of portions of motive fluid past the diaphragm, and deflecting vanes on one of said sections arranged forwardly of said diaphragm for throwing debris loosened from the pipe by the wiping elements and entrained in the motive fluid against the inner walls of the pipe for aiding the wiping elements in cleaning the pipe.

2. In a pipe cleaning apparatus of the character described, a body section, wiping means mounted on said body section, leaf springs rigidly mounted at their forward ends on the front and rear ends respectively of said section and having trailing pieces extending rearwardly therefrom, said trailing pieces being of a length sufficient to bridge openings in a pipe for allowing the body section to pass through said pipe over said openings.

3. In a pipe cleaning apparatus of the character described, a body section, wiping means mounted on said body section, leaf springs mounted at their forward ends on the forward end of said section and having trailing pieces extending rearwardly therefrom, said trailing pieces being of a length sufficient to bridge openings in a pipe for allowing the body section to pass through said pipe over said openings, and rollers mounted near the free ends of said springs.

4. In a pipe cleaning apparatus of the character described, a body section, wiping means mounted on said body section, leaf springs rigidly mounted at their forward ends on the front and rear ends respectively of said section and having trailing pieces extending rearwardly therefrom, said trailing pieces being of a length sufficient to bridge openings in a pipe for allowing the body section to pass through said pipe over said openings, and rollers mounted intermediately of the ends of said springs.

5. In a pipe cleaning apparatus of the character described, a body section, wiping means mounted on said body section, diagonally arranged deflecting vanes projecting forwardly respectively from one end only of said section arranged to deflect fluid entrained debris impinging thereagainst for throwing the same against the walls of a pipe through which the apparatus is traveling, and a diaphragm mounted on said body section having a flexible rim portion of a diameter less than the inner diameter of the pipe for respectively passing a predetermined quantity of motive fluid to be acted upon by said vanes and impeding flow of the remainder thereof to effect travel of the apparatus through said line.

6. In a pipe cleaning apparatus of the character described, a body section, pipe wiping means mounted on said body section, at least one deflecting vane mounted on said section exteriorly thereof and arranged diagonally relative to the longitudinal axis of said section to deflect fluid entrained debris impinging thereagainst for throwing the same with a scouring action against the walls of a pipe through which the apparatus is traveling, and a diaphragm mounted on said body section of a diameter less than the inner diameter of the pipe for respectively passing a predetermined quantity of motive fluid to be acted upon by said vane and impeding flow of the remainder thereof to effect travel of the apparatus through said line.

7. In a pipe cleaning apparatus of the character described, a body section, a plurality of leaf springs radially arranged about the forward end of said body section, the springs being fixed at their forward ends to said section and extending rearwardly therefrom in laterally diverging relation to said section, deflecting vanes mounted diagonally on said section between said springs, outwardly expansible leaf springs radially arranged on said section and diverging rearwardly therefrom, wiping elements on the outer ends of said springs, and a diaphragm mounted on said section at the rear end thereof of less diameter than a pipe into which the device may be inserted for passing and impeding passage of motive fluid medium from the rear to the front of said apparatus and for allowing the fluid to be acted upon by said vanes.

8. In a pipe cleaning apparatus of the character described, a body section, a plurality of leaf springs radially arranged about the forward end of said body section, the springs being fixed at their forward ends to said section and extending rearwardly therefrom in laterally diverging relation to said section, rollers mounted on said springs in angular relation to the longitudinal axis of said section intermediately of the ends of said springs, deflecting vanes mounted diagonally on said section between said springs, outwardly expansible leaf springs fastened near the rear of said section and extending rearwardly therefrom, wiping elements on the outer ends of said springs, a circular ring disposed about said wiping element springs, tie rods rigidly connecting said ring with said section to limit expansion of said wiping element springs, a diaphragm mounted on said section at the rear end thereof, said diaphragm having an outer resilient edge of less diameter than a pipe into which the device may be inserted for passing and impeding passage of motive fluid medium from the rear to the front of said apparatus and for allowing the fluid to be acted upon by said vanes, and leaf springs mounted on and extending rearwardly outwardly relative to said body section.

9. In a pipe cleaning apparatus of the character described, a body section, a plurality of leaf springs radially arranged about the forward end of said body section, the springs being fixed at their forward ends to said section and extending rearwardly therefrom in laterally diverging relation to said section, rollers mounted on said springs in angular relation to the longitudinal axis of said section intermediately of the ends of said springs, deflecting vanes mounted diagonally on said section between said springs, outwardly expansible leaf springs fastened near the rear of said section and extending rearwardly therefrom, wiping elements on the outer ends of said springs, a circular ring disposed about said wiping element springs, tie rods rigidly connecting said ring with said section to limit expansion of said wiping element springs, a diaphragm mounted on said section at the rear end thereof, said diaphragm having an outer resilient edge of less diameter than a pipe into which the device may be inserted for passing and impeding passage of motive fluid medium from the rear to the front of said apparatus and for allowing the fluid to be acted upon by said vanes, leaf springs mounted on and extending rearwardly outwardly relative to said body section, and rollers mounted intermediately of the ends of said springs in angular relation to the longitudinal axis of said body section.

CHARLES H. M. BURNHAM.